United States Patent [19]

Shields

[11] Patent Number: 4,651,400

[45] Date of Patent: Mar. 24, 1987

[54] MULTIPLE FUEL ROD GRIPPER

[75] Inventor: Edward P. Shields, North Huntingdon, Pa.

[73] Assignee: Westinghouse Electric Corp., Pittsburgh, Pa.

[21] Appl. No.: 564,053

[22] Filed: Dec. 21, 1983

[51] Int. Cl.[4] .......................... B23P 19/00; B66C 1/00
[52] U.S. Cl. ..................................... 29/426.5; 29/723; 294/102.1
[58] Field of Search ................ 273/42 A, 44 A, 54 E; 376/261, 264, 268, 269, 271; 294/86 A, 100, 102 R, 906; 29/723, 400 N, 426.5, 280, 278, 252, 253

[56] References Cited

U.S. PATENT DOCUMENTS

| 2,638,373 | 5/1953 | Alford | 294/102.1 |
| 3,068,035 | 12/1963 | Foglia | 294/102.1 |
| 3,278,186 | 10/1966 | Torresen | 273/42 A |
| 3,604,746 | 9/1971 | Notari | 294/90 |
| 3,904,048 | 9/1975 | Van Santen et al. | 414/146 |
| 4,192,715 | 3/1980 | Koshkin et al. | 176/30 |

FOREIGN PATENT DOCUMENTS 2842756 4/1979 Fed. Rep. of Germany .
2533065 3/1984 France .

Primary Examiner—Howard N. Goldberg
Assistant Examiner—Steven Nichols
Attorney, Agent, or Firm—L. A. DePaul

[57] ABSTRACT

Both an apparatus and a process for removing fuel rods from spent fuel assemblies is disclosed herein. The apparatus of the invention includes a locking plate having a plurality of tapered holes registrable with the rods of a fuel rod assembly, a plurality of tapered collets, each of which includes a hollow portion for receiving the ends of the fuel rods, and a plurality of hydraulically operated plungers for withdrawing each of the tapered collets into its respective tapered hole in the locking plate, thereby contracting the hollow portion of the collet around its respective rod in gripping engagement. The use of hydraulic plungers causes each of the collets to apply substantially the same gripping force onto its respective fuel rod. Additionally, the apparatus includes a means for confirming whether each of the collets has grippingly engaged its respective rod.

34 Claims, 6 Drawing Figures

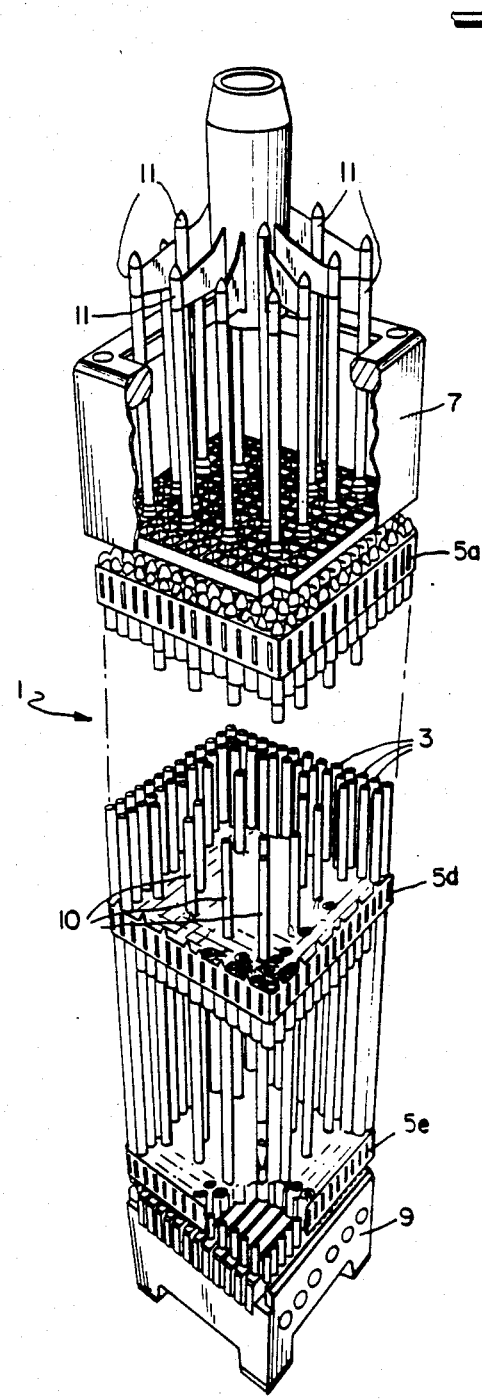
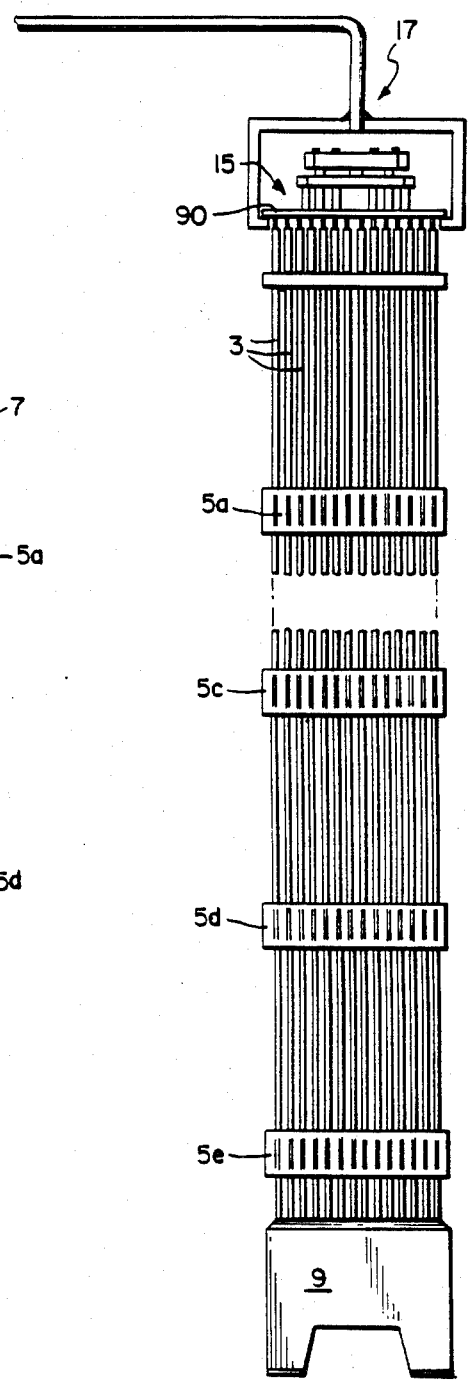
FIG. 1
FIG. 2

MULTIPLE FUEL ROD GRIPPER

BACKGROUND OF THE INVENTION

1. Field of the Invention

This invention concerns an apparatus and process for gripping and withdrawing the fuel rods out of a spent nuclear fuel assembly.

2. Description of the Prior Art

Gripping devices for removing the fuel rods from spent nuclear fuel assemblies are known in the prior art. The purpose of these devices is to reduce the storage space needed to store spent fuel rod assemblies in the storage pool of a nuclear power plant. In such assemblies, the fuel rods are vertically oriented and rectangularly spaced from one another by spacing grids. Such gripping devices grip and slidably withdraw the rectangularly spaced fuel rods out of the grids of their respective fuel rod assemblies so that they may be closely packed together in the on-site storage pool, thereby substantially reducing the storage space requirements for the spent assembly.

In one such prior art fuel rod gripper, the fuel rods are grippingly engaged by a plurality of cylindrical collets which are spring-loaded into the tapered holes of a locking plate. In this mechanism, the holes are tapered in both directions so that they flare out both at the bottom and the top of the locking plate. The cylindrical collets are inserted into the top tapered portions of these holes. The bottom tapered portion of these holes facilitates the insertion of the top end of a fuel rod into the hole. The gripper is lowered far enough into an array of spent fuel rods so that the ends of the rods extend completely through the tapered holes and into the hollow interior of the cylindrical collets. When the springs associated with each of the collets are compressed, the collets are forced into the upper tapered portion of their respective holes, which in turn causes them to contract around the ends of their respective fuel rods in gripping engagement. This particular fuel rod gripper is more specifically disclosed in U.S. patent application Ser. No. 418,141, filed Sept. 19, 1982, and assigned to Westinghouse Electric Corporation, now U.S. Pat. No. 4,551,299.

While the aforementioned fuel rod gripper has been successfully used to remove fuel rods from a spent fuel assembly, it is not without shortcomings. For example, the use of mechanical springs to apply a biasing force onto each of the collets causes the collets to apply a non-uniform gripping force to their respective fuel rods which is proportional to the diameters of their respective rods. Since there is normally some variation in the diameters of the rods, this prior art gripper applies non-uniform gripping forces on the rods. Such non-uniform gripping forces adversely affect the reliability of this gripper; i.e., some rods may be very firmly gripped, while others are not. Additionally, there is no provision in this gripper to conveniently confirm whether or not each of the collets has in fact grippingly engaged its respective fuel rod. This design deficiency can result in substantial delays in the operation of the device; when the gripper fails to grip all of the rods, it may have to be completely re-lowered and re-engaged with the removing rods. Further, such gripping failure necessitates a time-consuming "off-normal" operating mode in which the spent rods are transferred to an intermediate location before being deposited in their final location in the storage pool. Still another deficiency in the design of this gripper is the difficulty of replacing broken or damaged collets. The spring mechanism to which each collet was connected makes it difficult, if not impossible, to replace a single broken collet without completely disassembling this gripper. Finally, because the gripping action of each of the collets is much like a "Chinese handcuff" (i.e., the gripping force becomes greater in proportion to the resistance it encounters in lifting the fuel rod), the collets of this prior art gripper can inadvertently crush or tear the ends of their respective fuel rods if the rods become bound in the grids of the fuel rod assembly. Such breaking of the integrity of the rods can release radioactive uranium dioxide directly into the water of the core area of the reactor, thereby contaminating it.

Clearly, a need exists for a multiple fuel rod gripper which is capable of applying a uniform gripping force onto each one of the fuel rods of a spent fuel rod assembly, and which includes a means for confirming whether or not each of its collets has grippingly engaged its respective rods. Additionally, it would be desirable if such a gripper applied a limited maximum gripping force onto the ends of the fuel rods so that the rods will not become crushed or broken in the event they become stuck in the grids of the fuel rod assembly. Finally, it would be desirable if the collets could be individually replaced without the necessity of disassembling the entire gripper device.

SUMMARY OF THE INVENTION

In its broadest sense, the invention is an apparatus and process for gripping an array of rods which may be the fuel rods of a spent nuclear fuel assembly. The apparatus of the invention comprises a plurality of gripping members registrable with the rod array, each of which is capable of applying a substantially identical gripping force onto its respective rod. The invention may also include a means for confirming whether each of the gripping members has grippingly engaged its respective rod.

The invention may further include a plate having a plurality of tapered holes registrable with the fuel rods, and the plurality of gripping members may include tapered portions individually nested within the tapered holes of the plate. Each of the gripping members may also include a hollow portion which terminates in an open end for receiving a fuel rod. The invention may further include a closing means for causing the hollow portions of each of the gripping means to apply a substantially identical gripping force on the ends of the fuel rods by individually withdrawing each of the tapered portions of the gripping members through its respective tapered hole.

The means for confirming whether each of the gripping members has grippingly engaged its respective rod may include an electric switch operatively associated with each of the gripping members. Each of the switches may be connected to an indicator means, such as an electric indicator light, for indicating when its associated gripping member has withdrawn without a fuel rod present in its hollow portion.

The closing means may include a plurality of hydraulic plungers, each of which is connected to one of the gripping members, for withdrawing each of the gripping members through its respective tapered hole. Each of these hydraulic plungers may be operatively associated with a linear ratchet for securing the plunger, and hence its associated gripping member, in a gripping position. The invention may further include a release plate for releasing each of the linear ratchets associated with the plunger rods. Moreover, each of the plunger rods may actuate an electric switch connected to an electric indicator light when it is retracted without a rod grippingly engaged in its respective gripping member. The electric indicator lights may be arranged in a display panel for conveniently indicating which gripping members are not engaged to a rod.

Finally, the invention may also include a process for removing fuel rods from a fuel rod assembly, comprising the steps of registering an array of gripping members over the array of rods, and applying a substantially identical gripping force onto the ends of each of the rods incident to removing the rods from the fuel rod assembly. The process may further include the step of confirming whether or not each of the gripping members is engaged to a fuel rod.

BRIEF DESCRIPTION OF THE SEVERAL FIGURES

FIG. 1 is a perspective view of a fuel rod assembly, illustrating some of the principal components thereof in partial cross-section;

FIG. 2 is a side view of the fuel rod assembly of FIG. 1, with the gripper apparatus of the invention engaged thereto;

DETAILED DESCRIPTION OF THE PREFERRED EMBODIMENT

Figure 3:
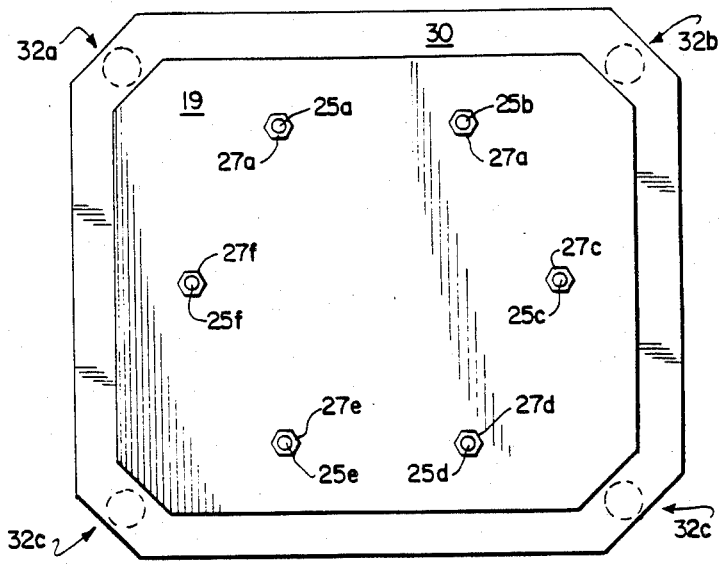
FIG. 3 is a top view of the preferred embodiment of the gripper apparatus.

With reference now to FIGS. 1 and 2, wherein like numerals indicate like components, the apparatus of the invention is a fuel rod gripper 15 for gripping and withdrawing the fuel rods from a spent fuel assembly 1. Such fuel rod assemblies 1 generally include an array of fuel rods 3 which are rectangularly spaced from one another by grids 5a, 5b, 5c and 5d. The fuel rods 3 are slidably disposed through bores in the grids 5a, 5b, 5c and 5d, and are vertically retained between a top nozzle 7 and a bottom nozzle 9. The top nozzle 7 and bottom nozzle 9 are connected to each other by way of an array of guide tubes 10. The guide tubes 10 are hollow metallic tubes through which control rods 11 may be inserted. Tubes 10 are preferably attached to the top nozzle 7, the bottom nozzle 9, and each of the grids 5a, 5b, 5c and 5d in order to provide a support structure for the fuel rods 3.

When the fuel rods 3 of the fuel rod assembly 1 become spent, the guide tubes 10 are cut below the upper ends of the rods 3 by an ID tube cutter of conventional design. The top nozzle 7 of the fuel rod assembly 1 is removed, and the fuel rod gripper 15 of the invention is positioned over the top of the fuel rod assembly 1 by means of a suspension assembly 17, as is best illustrated in FIG. 2. Suspension assembly 17 is basically an arm and cradle arrangement which supports the gripper 15 from its bottom-most component, locking plate 90. A specific description of how the gripper 15 may be manipulated and used is set forth in U.S. patent application Ser. No. 268,225, filed May 29, 1981, and assigned to Westinghouse Electric Corporation, the entire specification of which is expressly incorporated herein by reference.

Figure 4:
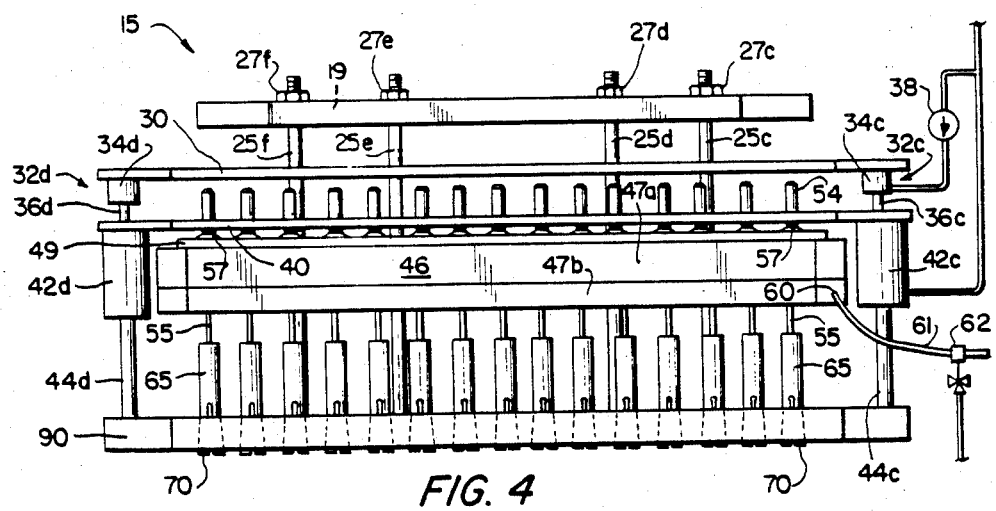
FIG. 4 is a side view of the preferred embodiment of the gripper apparatus.

With reference now to FIGS. 3 and 4, the gripper 15 of the invention generally includes a tie plate 19, as well as a switch plate 30, a release plate 40, and a cylinder block assembly 46. Gripper 15 further includes a locking plate 90 which has a plurality of tapered holes through which a plurality of gripping members or collets 65 are nested. Six hexagonally-disposed connecting rods 25a, 25b, 25c, 25d, 25e and 25f connect the tie plate 19 and the locking plate 90 to the cylinder block assembly 46. The release plate 40 and switch plate 30 are connected to the locking plate 90 by hydraulic cylinders 42a, 42b (not shown), 42c and 42d and 32a, 32b (not shown), 32c and 32d, respectively. The top portions of connecting rods 25a, 25b, 25c, 25d, 25e and 25f are mounted onto the tie plate 19 by nuts 27a, 27b, 27c, 27d, 27e and 27f, respectively. Each of the corners of the plates 19, 30, 40 and 90, as well as the cylinder block assembly 46, are preferably flattened for ease in handling.

Additionally, each of the plates 19, 30, 40 and 90, the cylinder block assembly 46, and the connecting rods 25a, 25b, 25c, 25d, 25e and 25f, are preferably formed from #304 stainless steel in order to prevent the corrosion which would otherwise occur from the constant exposure to boron salts. Unless otherwise specified, all bolts and washers are likewise formed from stainless steel, and all male threads are hard chrome-plated to prevent galling.

Tie plate 19 is attached to the cylinder block assembly 46 by connecting rods 25a, 25b, 25c, 25d, 25e and 25f. The upper portions of the connecting rods provide a guide means for switch plate 30 and release plate 40, and coact with tie plate 19 to lend rigidity to the overall structure of the gripper 15. The bottom portions of the connecting rods attach locking plate 90 to the cylinder block assembly 46. The connecting rods are preferably arranged in a configuration which corresponds to the arrangement of the guide tubes 10 of the fuel assembly 1. Such an arrangement insures that the threaded ends of the lower portion of the connecting rods will not register with any of the tapered holes 92 in locking plate 90.

Figure 5:
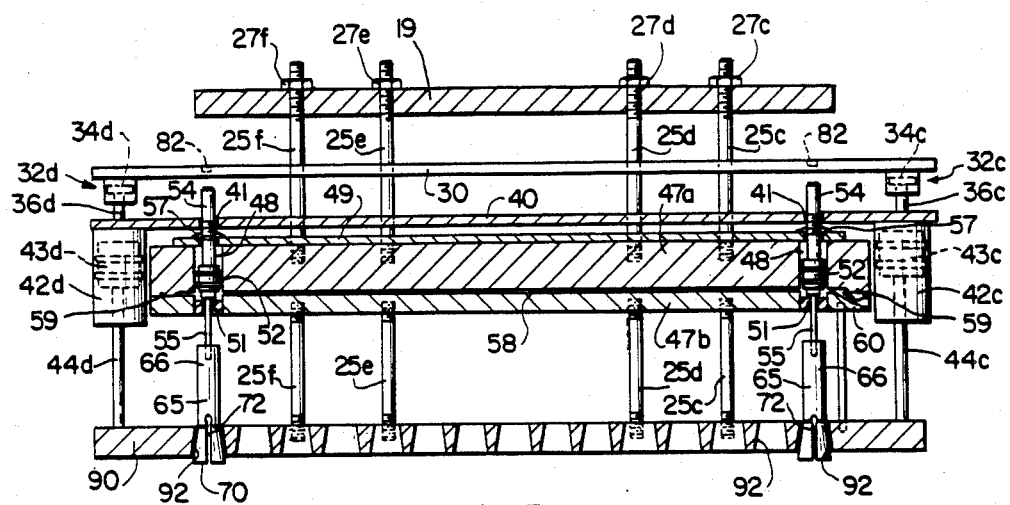
FIG. 5 is a partial cross-sectional side view of this preferred embodiment.

With reference now to FIGS. 4 and 5, the gripper further includes a switch plate 30 mounted under and parallel to the tie plate 19. Switch plate 30 is movable relative to the tie plate 19 by means of hydraulic cylinders 32a, 32b (not shown), 32c and 32d, as well as hydraulic cylinders 42a, 42b, (not shown), 42c, and 42d. Switch plate 30 preferably includes six bores (not shown) through which connecting rods 25a, 25b, 25c, 25d, 25e and 25f may freely slide so that they do not impede relative movement between the switch plate 30 and the tie plate 19. As will be described in more detail hereinafter, stop plate 30 includes a plurality of electric proximity switches 80 arrayed in the same configuration as the plunger rods 54 extending out of the cylinder block assembly 46.

Switch plate 30 performs two important functions. First, the switches 80 mounted therein change state whenever the end of a plunger rod 54 abuts the plate, as occurs when the gripping member or collet 65 associated with a particular plunger 50 fails to grip a fuel rod 3. As will be discussed in detail later, each of the proximity switches 80 is connected to an electric indicator lamp 84 mounted on a display panel in order to provide a positive indication as to which collets 65 failed to grippingly engage their respective fuel rods 3. Secondly, switch plate 30 coacts with release plate 40 in order to release the rods 3 from the gripper 15 by pushing the plunger rod 54 back into their initial positions, which in turn repositions the collets 65 back into their initial, non-gripping position.

Gripper 15 further includes a release plate 40 for releasing the linear ratchets 56.1 associated with each of the plunger rods 54. Like switch plate 30, release plate 40 is parallel to and under tie plate 19, and includes a plurality of bores (not shown) through which connecting rods 25a, 25b, 25c, 25d and 25f may freely slide. Release plate 40 is vertically movable relative to the cylinder block assembly 48 by means of hydraulic cylinders 42a, 42b (not shown), 42c and 42d. Release plate 40 further includes a plurality of bores 41 through which the plunger rods 54 of the plungers 50 may freely slide. The bores 41 of the release plate 40 function to release the linear ratchets 56.1 associated with each of the plungers 50 when pressurized hydraulic fluid is admitted into the bottom portions of the hydraulic cylinders 42a, 42b (not shown), 42c and 42d. The admission of such pressurized fluid causes these cylinders to retract and to push release plate 40 into the bellville washers 57 of the linear ratchets 56.1, thereby flattening them. As will be described in more detail presently, once the cylinders 42a, 42b (not shown), 42c and 42d have caused release plate 40 to release the linear ratchets 56.1, check valve 38 will divert a flow of hydraulic fluid to cylinders 32a, 32b (not shown), 32c, and 32d which will cause the switch plate 30 to push down on the plunger rods 54 and restore them to their initial positon.

Figure 6:
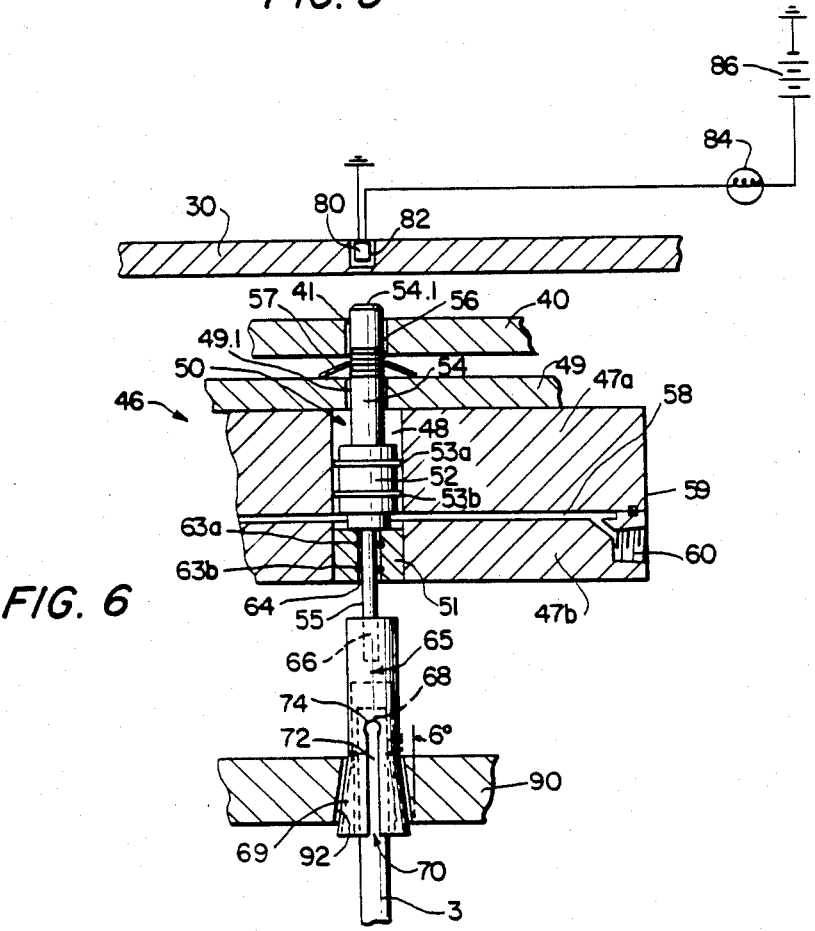
FIG. 6 is a side, cross-sectional view of one of the individual gripping members and hydraulic plungers of the invention.

With reference now to FIGS. 5 and 6, the cylinder block assembly 46 includes a top half 47a and a bottom half 47b which are sealingly engaged around their edges by a square "O" ring 59. Top half 47a of the assembly 46 includes a plurality of cylinder bores 48 which house a plurality of plunger cylinders 52 which reciprocate between retainer plate 49 and bronze inserts 51. The retainer plate 49 of the top half 47a of the assembly 46 includes a plurality of bores 49.1 through which the plunger rods 54 of the plunger 50 extend. Because the plungers 50 are only single-action hydraulic plungers, no fluid seal is required between the retainer plate bores 49.1 and the plunger rod 54. A flat fluid cavity 58 is defined between the top half 47a and bottom half 47b of the cylinder block assembly 46 which fluidly communicates with each of the cylinder bores 48. As is best seen in FIGS. 4 and 6, a source of pressurized, hydraulic fluid is connected to fluid cavity 58 at threaded inlet 60. With specific reference to FIG. 4, the flow of pressurized hydraulic fluid (which is pure, de-ionized water in the preferred embodiment) flows into the threaded inlet 60 through hydraulic conduit 61 via solenoid operated valve 62. In the preferred embodiment, valve 62 is a three-way valve which is capable of controlling the flow of hydraulic fluid both into and out of the cylinder block assembly 46. The admission of pressurized, hydraulic fluid into the flat fluid cavity 58 via valve 62 will, of course, exert fluid pressure on the bottom faces of the plunger pistons 52 and cause them to retract.

The plungers 50 of the gripper 15 each include a plunger piston 52, a pair of plunger piston seals 53a, 53b, a plunger rod 54, and a plunger stem 55. With the exception of the piston seals 53a, 53b, all other parts of the plungers 50 are preferably integrally formed from a single piece of stainless steel bar stock. The plunger rod 54 of each of the plungers 50 includes a linear ratchet mechanism 56.1 formed from a plurality of ratchet ribs 56 which snap into the inner lips of the bellville washers 57 circumscribing each of the plunger rods 54. As will be described in more detail presently, the ratchet mechanisms 56.1 secure the collets 65 connected to the plungers 50 in a gripping position after the open ends 70 of the collets 65 have been snugged around the ends of the fuel rods 3. Each of the ends of the plunger rods 54 includes an end cap 54.1 of ferrous material for actuating a proximity switch 80 located in switch plate 30 whenever the plunger rod 54 abuts the switch plate 30, which occurs whenever its respective collet 65 is withdrawn through locking plate 90 without engaging a fuel rod 3. The stems 55 of the plungers 50 extend down from each of the plunger pistons 52 through the bore 64 of its respective bronze insert 51. It should be noted that each of the stems 55 terminate in a screw thread and that each of the bronze inserts 51 includes a pair of "O" rings 63a, 63b for forming a fluid seal between the stem 55 and the insert 51.

The collets 65 of the invention generally include a base portion 66, and a cylindrically shaped, hollow portion 68 which terminates in an open end or mouth 70. The walls 67 of the lower portion 68 are tapered as shown so that the lower portion 68 assumes a frusto-conical shape. The bore portion 66 includes a female thread which screws onto the male thread located at the end of plunger stem 55. Such a "screw-type" connection between the collet 65 and the plunger stem 55 greatly facilitates the replacement of single collets should replacement become necessary. The tapered walls 69 of the lower portion 68 of the collet 65 includes a pair of longitudinal slots 62 which extend from the edge of the mouth 70 to about halfway along the longitudinal axis of the collet 65, as shown. These longitudinal slots 72 terminate in a stress-relieving circular opening 74. The provision of the longitudinal slots 72 allows the hollow portion 68 and mouth 70 of the collet 65 to be resiliently contracted or expanded as the collet 65 is withdrawn or extended through the tapered hole 92 of locking plate 90. Preferably, the walls 69 of the collet 65 flare out at approximately 6° from the longitudinal axis of the plunger 50 as indicated. Such a small angle allows the hydraulic plunger 50 to generate a strong wedging force between the hollow portion 68 of the collet 65, and the end of the fuel rod 3. In the preferred embodiment, each of the collets 65 is formed from a solid piece of lathed and drilled out 17-4 PH stainless steel so the tapered walls 59 will be sufficiently resilient to expand and contract through their respective tapered hole in locking plate 90 many times without metal fatigue.

As has been previously indicated, locking plate 90 includes a plurality of tapered holes 92 in which the tapered walls 69 of each of the collets 65 are nested. The interior surfaces of each of these tapered holes 92 is hard chrome-plated in order to prevent galling between the walls 69 of the collets 65 and the tapered holes 92. Additionally, each of these holes 92 is preferably flaired at the same 6° angle as the collets 65. Locking plate 90 is rigidly attached to the bottom half 47b of the cylinder block assembly by the bottom portions of connecting rods 25a, 25b, 25c, 25d, 25e and 25f as previously described.

In operation, the guide tubes 10 of a spent fuel rod assembly 1 are cut below the tops of the fuel rods 3 by means of a conventional ID cutter. The guide tubes 10 are hollow, and the cutting operation is normally performed by inserting the ID cutter inside the tubes 10. After all of the guide tubes 10 are cut, the top nozzle 7 of the fuel rod assembly 1 is removed. In order to facilitate the registration of the top ends of the fuel rods 3 with the tapered holes 92 and open ends 70 of the gripping members or collets 65, a comb or temporary grid (not shown) is placed on the upper portion of the fuel rods 3 which spaces them in precise rectangular alignment. After the comb is installed, the fuel rod gripper 15 is lowered over the top ends of the fuel rods 3 by suspension assembly 17, which may also include a comb for facilitating proper alignment of the rods 3. A gripper guide frame (not shown) may be used in conjunction with the fuel rod gripper 15, as may the apparatus disclosed in previously mentioned U.S. patent application Ser. No. 268,225, filed May 29, 1981, assigned to Westinghouse Electric Corporation.

After suspension arm 17 places the mouths or open ends 70 of the collets 65 in registration with the ends of the fuel rods 3, the fuel rod gripper 15 is lowered so that the ends of each of the fuel rods 3 are received within the hollow portions 68 of each of the collets 65. Fluid valve 62 is then opened, thereby allowing pressurized hydraulic fluid to flow into the flat fluid cavity 58 disposed within the top and bottom halves 47a, 47b of the cylinder block assembly 46. This pressurized hydraulic fluid flows through the cavity 58 and into the lower portions of the cylinder bores 48 of the cylinder block assembly 46, thereby applying a hydraulic retracting force on the lower faces of each of the plunger pistons 52. Each of the plungers 50 consequently retracts, thereby withdrawing the tapered walls 69 of its attached collet 65 through its respective tapered hole 92 in the locking plate 90. The hollow portion 68 of each of the collets 65 consequently contracts around the top end of its respective fuel rod 3 in gripping engagement. Simultaneously, the bellville washers 57 of each of the linear ratchets 56.1 snaps into the ratchet grooves 56 of its respective plunger rod 54 so that it secures the plunger rod 54 in its most retracted position. Normally, the most extreme retracted position that any of the plunger rods 54 assumes will still leave a gap between the switch plate 30 and the end cap 54.1 of ferrous material attached to each of the rods 54. However, if the collet 65 has not grippingly engaged the end of a fuel rod 3, or has slipped from a gripping engagement of its respective rod 3, the plunger 50 connected to the collet 65 will retract until its respective plunger rod 54 abuts the switch plate 30 in the vicinity of a proximity switch 82. The state of proximity switch 82 will then change, thereby conducting an electric current to an electric indicator light 84, which may be an LED. Preferably, all of the electric indicator lights 84 connected to the proximity switches 80 are mounted on a display panel which is arranged in the same geometrical configuration as their associated collets 65. With the electric indicator lights 84 so arranged, the operation of the gripper 15 could determine at a glance exactly which collets 65 had not grippingly engaged a fuel rod 3.

If any of the electric indicator lights 84 are actuated after the fluid valve 62 is opened, the fluid pressure within the cylinder block assembly 46 is relieved via three-way valve 62, and another attempt is made to grip all of the top ends of the fuel rods 3 by collets 65 by reintroducing more hydraulic fluid into the cylinder block assembly 46 via valve 62.

Once all of the electric indicator lights 84 indicate that all of the collets 65 are grippingly engaged to a fuel rod 3, the fuel rods 3 of the spent fuel rod assembly 1 are removed by lifting the gripper 15 up by the suspension assembly 17. The spent fuel rods are then lowered into a transition canister (not shown), and released by the gripper 15.

To release each of the rods 3 from the gripper 15, the hydraulic pressure in the cylinder block assembly 46 is first relieved. Next, hydraulic fluid is introduced into the lower portions of the hydraulic cylinders 42a, 42b (not shown), 42c and 42d as indicated in FIG. 4. The introduction of such fluid pushes the hydraulic pistons 43a, 43b (not shown), 43c and 43d up into their respective cylinders 42a, 42b (not shown), 42c and 42d, which in turn pulls the release plate 40 into the bellville washers 57 of the linear ratchet mechanisms 56.1 associated with each of the plungers 50. The bellville washers are thereby flattened, which disengages them from the ratchet grooves 56 of their associated plunger rods 54. After the pressure in the hydraulic cylinders 42a, 42b (not shown), 42c and 42d becomes sufficiently great to flatten the washers 57 and release all the liner ratches 56.1, check valve 38 conducts pressurized hydraulic fluid to the lower portion of switch plate cylinders 32a, 32b (not shown), 32c and 32d. The rods 36a, 36b (not shown), 36c and 36d of these cylinders then retract, thereby pulling the switch plate 30 into the plunger rods 54, which in turn restores each of the plungers 50 back to its initial, unretracted position. Consequently, each of the collets 65 is extended back into its initial position, which in turn causes its hollow portion to resiliently expand and to disengage its respective fuel rod 3. Accordingly, the fuel rods 3 are deposited into the rod storage cannister.

It should be noted that the use of a hollow collet 65 with tapered walls 69 in conjunction with a tapered hole 92 of complementary shape limits the amount of gripping force which the collet 65 can apply to the end of the rod 3, in contract to the "Chinese handcuff" design of the prior art, which can break or tear the control rod 3 if it becomes stuck in the grids of the fuel rod assembly 1.

What is claimed is:

1. An apparatus for gripping an array of rods comprising:
 (a) a plurality of gripping members grippingly engageable with said rods, each of which ahs a hollow portion terminating in an open end for receiving the end of one of said rods;
 (b) a closing means for causing the hollow portion of each of said gripping members to apply substantially the same gripping force onto the end of its respective rod, including
  (i) a locking plate having a plurality of tapered holes registrable with said array of rods, wherein the exterior of each of said gripping members is tapered and nested within one of said tapered holes,
  (ii) a withdrawing means having a hydraulic plunger operatively connected to each of said gripping members for applying a substantially identical withdrawing force on each of said gripping members, whereby the hollow portion of each of the gripping members applies substantially the same gripping force on its respective rod, and
 (c) means for detecting whether each of said gripping members has grippingly engaged its respective rod.

2. A multiple fuel rod griper for extracting nuclear fuel rods from a nuclear fuel assembly, comprising:
   (a) a plate having a plurality of tapered holes registrable with said fuel rods;
   (b) a plurality of gripping members, each of which includes walls nested within one of said tapered holes, and each of which further includes a hollow portion having an open end for receiving a fuel rod;
   (c) means for positioning the open end of each of said gripping members over the ends of the fuel rods of a nuclear fuel assembly;
   (d) a closing means for causing said hollow, tapered portion of each of said gripping members to apply substantially the same gripping force on its respective fuel rod by applying a substantially identical withdrawing force on each of said gripping members, and
   (e) a securing means including a ratchet for securing each of said gripping members in a withdrawn position.

3. The multiple fuel rod gripper of claim 2, further including an electric switch operatively associated with each of said gripping members which changes state whenever its associated gripping member is withdrawn without a fuel rod grippingly engaged within its hollow portion.

4. The multiple fuel rod gripper of claim 3, wherein each of said switches is connected to an indicator means for indicating which of the gripping members is withdrawn without a fuel rod present within its hollow portion.

5. The multiple fuel rod gripper of claim 2, wherein each of said switches is operatively connected to an indicator light.

6. The multiple fuel rod gripper of claim 2, wherein each of said lights is arranged on a display panel.

7. The multiple fuel rod gripper of claim 2, wherein said closing means includes a plurality of plunger members, each of which is operatively connected to one of said gripping members.

8. The multiple fuel rod gripper of claim 7 wherein said ratchet of said securing means includes a linear ratchet operatively associated with each of said plunger members for securing each of the gripping members connected to the plungers in a withdrawn position.

9. The multiple fuel rod gripper of claim 7, wherein each of said plungers is hydraulically operated.

10. The multiple fuel rod gripper of claim 2, wherein said closing means includes a cylinder block assembly having a plurality of plunger members, each of which is connected to one of said gripping members.

11. The multiple fuel rod gripper of claim 10, wherein each of said plungers is hydraulically operated, and wherein said cylinder block assembly is connected to a source of pressurized hydraulic fluid by way of a fluid valve.

12. The multiple fuel rod gripper of claim 11, wherein each of said plungers is fluidly connected to said source of pressurized hydraulic fluid.

13. The multiple fuel rod gripper of claim 12, wherein said hydraulic fluid operates to retract each of said plungers when said valve is open.

14. A multiple fuel rod gripper for extracting nuclear fuel rods from a nuclear fuel assembly, comprising:
   (a) a plate having a plurality of tapered holes registrable with said fuel rods;
   (b) a plurality of gripping members, each of which includes a tapered portion nested within one of said tapered holes, and each of which includes a hollow portion terminating in an open end for receiving a fuel rod;
   (c) means for positioning the hollow portions of said gripping members over the ends of the fuel rods of a nuclear fuel assembly, and
   (d) a cylinder block assembly for individually withdrawing the tapered portion of each of said gripping members through its respective tapered hole, thereby causing said hollow portion of each of said gripping members to grip its respective fuel rod.

15. The multiple fuel rod gripper of claim 14, wherein said cylinder block assembly includes a plurality of retractable plungers, each of which is connected to one of said gripping members, for withdrawing its respective gripping member through its respective tapered hole.

16. The multiple fuel rod gripper of claim 15, further including a means for restoring said plurality of retractable plungers from a retracted position to an extended position.

17. The multiple fuel rod gripper of claim 16, further including a ratchet means operatively associated with each plunger for securing its respective plunger in a retracted position, which in turn secures the gripping member associated therewith in a withdrawn position in its respective tapered hole.

18. The multiple fuel rod gripper of claim 17, wherein said means for restoring said plurality of retractable plungers from a retracted position to an extended position includes a means for releasing said ratchet means.

19. The multiple fuel rod gripper of claim 18, wherein said means for restoring said plurality of retractable plungers from a retracted position to an extended position further includes a means for exerting a restorative force onto said plungers.

20. The multiple fuel rod gripper of claim 19, wherein said means for restoring said plurality of retractable plungers from a retracted position to an extended position includes a plate.

21. The multiple fuel rod gripper of claim 20, wherein said plate includes a plurality of switching means operatively associated with the ends of the plungers of said cylinder block assembly.

22. The multiple fuel rod gripper of claim 21, wherein said switching means are proximity switches, and wherein each switch is connected to an electric indicator light.

23. The multiple fuel rod gripper of claim 20, further including means for moving said plate toward said ends of said plungers to force said plungers into said extended position.

24. The multiple fuel rod gripper of claim 23, wherein said means for moving said plate includes at least one hydraulically operated cylinder.

25. The multiple fuel rod gripper of claim 21, wherein said plate also functions to stop the retraction of plungers who respective gripping members are not engaged to fuel rods, and wherein said switching means indicate which of said plungers retracted without engaging a fuel rod in its respective gripping member.

26. A process for removing the fuel rods from a fuel rod assembly, comprising the steps of:
   (a) removing the top nozzle of the fuel rod assembly;
   (b) positioning an array of gripping members, each of which has an outwardly tapered contractable hollow portion, in registration with the top ends of said fuel rods, so that the top end of each of the fuel rods is surrounded by the hollow portion of one of said gripping members;

(c) contracting said outwardly tapered hollow portions of said gripping members by withdrawing each of said gripping members through a tapered hole in order to frictionally engage each of the top ends of the fuel rods with a preselected force that is less than the tensile strength of the rods, and (d) confirming whether or not each of said gripping members is engaged to a fuel rod after said member is withdrawn through a tapered hole.

27. The process of claim 26, wherein each of said gripping members is operatively associated with an electric indicating means for indicating when said gripping member has been withdrawn through its respective tapered hole without grippingly engaging a fuel rod.

28. The process of claim 26, further including the step of securing each of said gripping members in a rod gripping position.

29. The process of claim 28, further including the step of releasing each of said gripping members from said rod gripping position.

30. An apparatus for gripping an array of rods, comprising:

(a) a plurality of gripping members grippingly engageable with said rods, each of which has an outwardly tapered wall that defines a hollow portion terminating in an open end for receiving the end of one of said rods;

(b) a withdrawing means for applying a withdrawing force on each of the gripping members, and (c) a closing means for compressing the outwardly tapered wall of each gripping member into frictional engagement with said rod so that each gripping member applies a preselected gripping force onto its selected rod that is less than the tensile strength of the rod when the withdrawing means withdraws the gripping members.

31. The apparatus of claim 30, wherein said closing means includes a locking plate having a plurality of tapered holes registrable with said array of rods, and wherein the outwardly tapered walls of each of the gripping means is nested within each of the tapered holes so that the holes compress the walls of each gripping means when the withdrawing means withdraws the gripping means therein.

32. The apparatus of claim 30, wherein the withdrawing means includes a hydraulic plunger operatively connected to each of said gripping members.

33. The apparatus of claim 30, further including detecting means for detecting whether each of said gripping members has grippingly engaged its respective rod.

34. The apparatus of claim 33, wherein the withdrawing means includes a hydraulic plunger operatively connected to each of said gripping members, and the detecting means includes microswitches that are actuated by the hydraulic plungers of the withdrawing means.

* * * * *